United States Patent
Yo

(10) Patent No.: US 12,475,626 B2
(45) Date of Patent: Nov. 18, 2025

(54) METHODS AND SYSTEMS FOR GENERATING AND DISTRIBUTING A PLAYBOOK

(71) Applicant: Yo Playbook, Inc., Valley Cottage, NY (US)

(72) Inventor: Inku Yo, Valley Cottage, NY (US)

(73) Assignee: Yo Playbook, Inc., Valley Cottage, NY (US)

( * ) Notice: Subject to any disclaimer, the term of this patent is extended or adjusted under 35 U.S.C. 154(b) by 54 days.

(21) Appl. No.: 18/072,332

(22) Filed: Nov. 30, 2022

(65) Prior Publication Data

US 2024/0020904 A1    Jan. 18, 2024

Related U.S. Application Data

(60) Provisional application No. 63/368,769, filed on Jul. 18, 2022.

(51) Int. Cl.
*G06T 13/80* (2011.01)
*G06T 3/40* (2024.01)

(52) U.S. Cl.
CPC .............. *G06T 13/80* (2013.01); *G06T 3/40* (2013.01)

(58) Field of Classification Search
CPC ................... G06T 13/80; G06T 3/40
See application file for complete search history.

(56) References Cited

U.S. PATENT DOCUMENTS

| | | | |
|---|---|---|---|
| 11,182,938 B1* | 11/2021 | Graham | G06T 11/203 |
| 11,862,036 B2 | 1/2024 | Molenje et al. | |
| 2011/0190048 A1 | 8/2011 | Walthour | |
| 2012/0244942 A1 | 9/2012 | Meyer et al. | |
| 2014/0370486 A1 | 12/2014 | Friehauf | |
| 2015/0088648 A1* | 3/2015 | Chitnis | G06F 16/2457 705/14.54 |
| 2015/0287403 A1* | 10/2015 | Holzer Zaslansky | G06T 13/205 704/231 |
| 2015/0350737 A1* | 12/2015 | Anderson | G06F 40/169 348/564 |
| 2017/0286711 A1* | 10/2017 | Negrea | H04L 63/10 |
| 2017/0303075 A1* | 10/2017 | Chui | G06F 21/42 |
| 2018/0005544 A1 | 1/2018 | Molenje et al. | |
| 2021/0065421 A1* | 3/2021 | Kurabuchi | H04N 21/23412 |
| 2021/0354017 A1 | 11/2021 | Friehauf | |
| 2022/0293004 A1 | 9/2022 | Clayton et al. | |
| 2024/0105080 A1 | 3/2024 | Molenje et al. | |

\* cited by examiner

*Primary Examiner* — Yi Yang
(74) *Attorney, Agent, or Firm* — Banner & Witcoff, Ltd.

(57) ABSTRACT

Methods and systems disclosed herein describe creating and/or distributing media files associated with a playbook for a sports team. A user may use a computing device to create, or edit, a play. The location of the players, the ball, and their respective movements may be recorded in a flat file that is used to generate an animation of the play. The flat file may be transmitted to a server, which may use the flat file to generate the animation of the play. The animation of the play may be distributed (e.g., sent) to one or more people associated with the team. Additionally, the animation of the play may be added to a playbook of a sports application, which may be a single point of contact for coaches, managers, parents, and/or athletes.

20 Claims, 11 Drawing Sheets

100

METHODS AND SYSTEMS FOR GENERATING AND DISTRIBUTING A PLAYBOOK

CROSS-REFERENCE TO RELATED APPLICATIONS

This application claims priority to U.S. Provisional Application No. 63/368,769, filed on Jul. 18, 2022 and entitled "Computer-Implemented Methods and Systems Enabling Multi-User Participation in Play Development in Amateur Sports," the entirety of which is incorporated herein by reference.

FIELD OF USE

Aspects of the disclosure generally relate to creating and distributing content associated with team sports.

BACKGROUND

Mobile applications for amateur and/or youth sports teams provide contact information for players, managers, and/or coaches, as well as scheduling information for practices and/or games. However, these mobile applications fall short at providing information to help the athletes grow. Most mobile applications do not include playbooks where athletes can review or study plays. The mobile applications that do include playbooks typically use videos. Accordingly, these mobile applications fall short in providing an interface where anyone can create and/or share plays. Moreover, the video files are relatively large in size, making them unsuitable for sharing plays over cellular communication networks and/or areas where there is low connectivity, such as those around playing fields.

SUMMARY

The following presents a simplified summary of various features described herein. This summary is not an extensive overview, and is not intended to identify key or critical elements or to delineate the scope of the claims. The following summary merely presents some concepts in a simplified form as an introductory prelude to the more detailed description provided below. Corresponding apparatus, systems, and computer-readable media are also within the scope of the disclosure.

The present disclosure describes techniques for creating and/or distributing media files associated with a playbook for a sports team. A user may use a computing device to create, or edit, a play. The computing device may display a playing field. The user may create a play by positioning players, from both the current team and/or the opposing team, on the playing field. After the players are positioned, the computing device may receive a location of each of the players, their movements on the playing field, a location of the ball, and/or the ball's movement on the playing field. The location of each of the players, their movements on the playing field, the location of the ball, and/or the ball's movement on the playing field may be recorded in a flat file that is sent (e.g., transmitted) to a server. The server may use the flat file to generate an animation of the play. In some instances, the server may generate a plurality of animations of the play. In doing so, the server may provide a device-agnostic solution, where the play may be displayed regardless of the type of device being used to display the animation. The server may distribute the animations to a plurality of user devices, which users may then review and/or study to grow as an athlete. The use of a flat file may produce a file with a small memory footprint (e.g., <1 megabyte), which allows the flat file to be transmitted over cellular, or other low bandwidth, communication networks. This would allow coaches, managers, players, athletes, and/or parents to receive the play on their mobile devices when connectivity is low. Additionally, the flat file may allow the computing device and/or the server to generate an animation of a play, which may be distributed via short-range wireless protocols and/or during periods of low connectivity (like those found at, or around, playing fields).

These improvements, along with many others, will become apparent from the discussion below.

BRIEF DESCRIPTION OF THE DRAWINGS

The present disclosure is described by way of example and not limited in the accompanying figures in which like reference numerals indicate similar elements and in which.

DETAILED DESCRIPTION

In the following description, reference is made to the accompanying drawings, which form a part hereof, and in which are shown various examples of features of the disclosure and/or of how the disclosure may be practiced. It is to be understood that other features may be utilized and structural and functional modifications may be made without departing from the scope of the present disclosure. The disclosure may be practiced or carried out in various ways. In addition, it is to be understood that the phraseology and terminology used herein are for the purpose of description and should not be regarded as limiting. Rather, the phrases and terms used herein are to be given their broadest interpretation and meaning.

By way of introduction, features discussed herein may relate to methods, devices, systems, and/or instructions stored on non-transitory computer-readable media for creating and/or distributing media files associated with a playbook for a sports team. A computing device may be used to create, or edit, a play. The computing device may cause a playing field to be displayed. Using the displayed playing field, the user may create a play by initially positioning players on the playing field. In some instances, the user may position players from both teams (e.g., offensive team and defensive team). After the players are in position, the computing device may receive a location of each of the players, their movements on the playing field, a location of the ball, and/or the ball's movement on the playing field. This information may be saved in memory and/or written to a flat file. The information may be sent (e.g., transmitted) to a server, which uses the information to generate an animation of the play. According to some embodiments, the server may generate a plurality of animations of the play to provide a suitable animation for each type of user device that may view the play. In some instances, the server may add the play to a playbook of a sports application. Coaches, managers, parents, and/or athletes may access the playbook, via the sports application, to create new plays, study or review existing plays, edit existing plays, etc.

Figure 1:
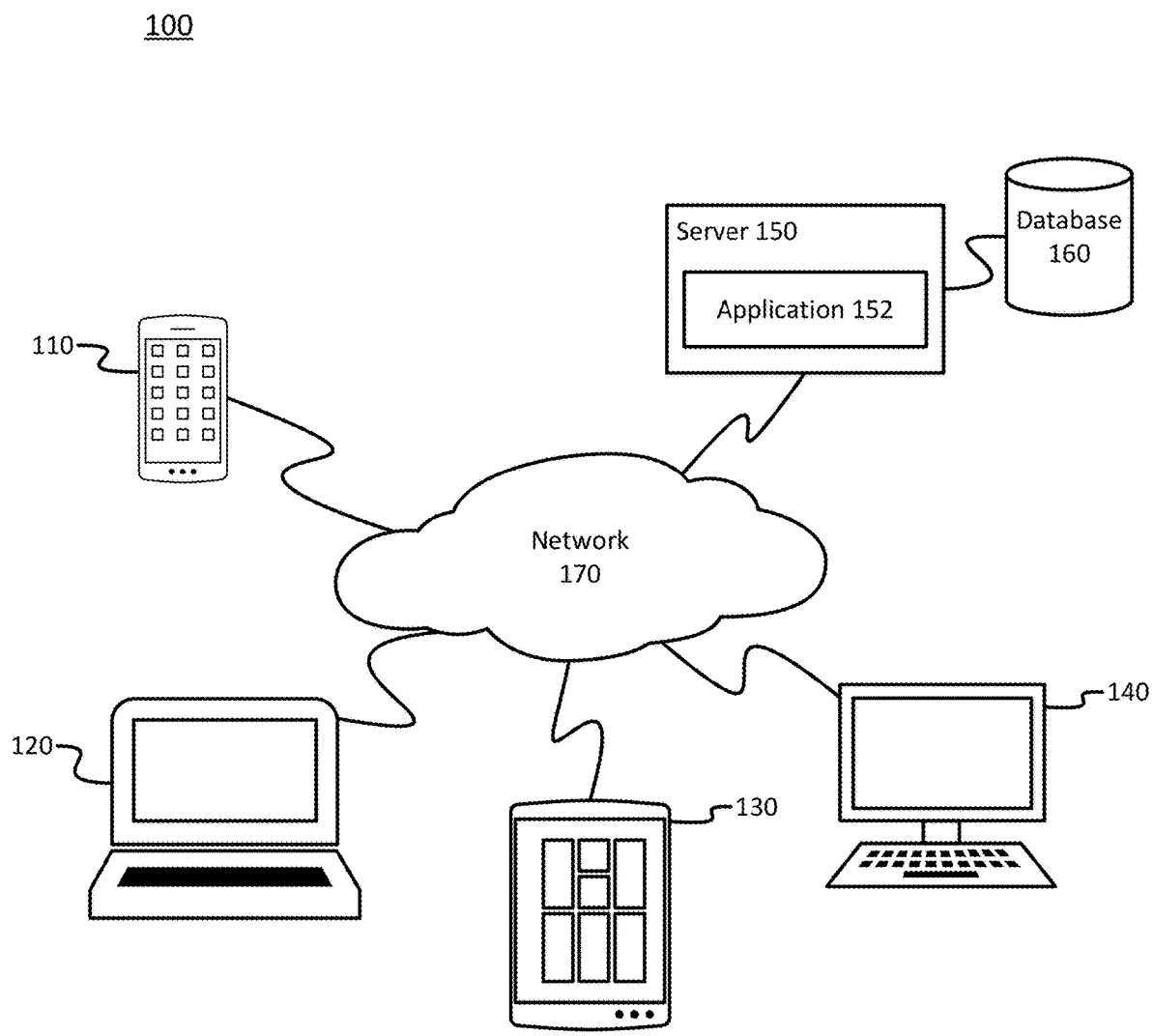
FIG. 1 shows an example of a system in which one or more features described herein may be implemented.

FIG. 1 shows an example of a system 100 that includes a first user device 110, a second user device 120, a third user device 130, a fourth user device 140, and a server 150, connected to a first database 160, interconnected via network 170.

First user device 110 may be a mobile device, such as a cellular phone, a mobile phone, a smart phone, a tablet, a laptop, or an equivalent thereof. First user device 110 may be associated with a first user, such as a coach of an amateur and/or youth sports team. First user device 110 may provide a first user with access to various applications and/or services, including one or more applications and/or services that allow the first user to access the Internet. Additionally, first user device 110 may provide the first user with one or more applications ("apps") located thereon. The one or more applications may provide the first user with a plurality of tools and access to a variety of services. A first application, of the one or more applications, may include a sports application. The sports application may provide a single point of contact for coaches, managers, parents, and/or athletes. Additionally or alternatively, the sports application may include a homepage for the amateur and/or youth sports team. The homepage may allow the first user to access a plurality of information associated with the amateur and/or youth sports team. The plurality of information may include game and/or practice schedules, contact information, etc. Additionally, the homepage may provide a social networking component that allows the coaches, managers, parents, and/or athletes to communicate and/or share content (e.g., images, photos, videos, GIF s, plays, etc.). In further aspects, the homepage and/or sports application may provide access to a playbook that includes one or more plays (e.g., animated plays) for coaches, managers, parents, and/or athletes. The playbook may include a user interface that allows users (e.g., coaches, managers, parents, and/or athletes) to study (e.g., review) existing plays, create new plays, share plays with others, comment or ask questions on existing plays, etc.

Second user device 120 may be a computing device configured to allow a user to execute software for a variety of purposes. Second user device 120 may belong to the first user that accesses first user device 110, or, alternatively, second user device 120 may belong to a second user, different from the first user. For example, the second user may be an athlete or the parent of the athlete of the amateur and/or youth sports team. Second user device 120 may be a desktop computer, laptop computer, or, alternatively, a virtual computer. The software of second user device 120 may include one or more web browsers that provide access to websites on the Internet. The one or more web browsers may allow the second user to access a web platform associated with the sports application discussed above. That is, the second user may log in to a web page associated with the sports application. After successfully logging in, the second user may access a homepage for the amateur and/or youth sports team. As noted above, the homepage may allow the second user to access a plurality of information associated with the amateur and/or youth sports team, including game and/or practice schedules, contact information, etc. Additionally, the homepage may allow the second user to access the social networking component. Additionally or alternatively, the second user may access to the playbook to study (e.g., review) existing plays, create new plays, edit existing plays, share plays with others, comment or ask questions on existing plays, etc.

Third user device 130 may be a tablet or slate device, or an equivalent thereof. Third user device 130 may be associated with a third user, such as an athlete or parent of an athlete Like first user device 110 above, third user device 130 provide the third user with access to various applications and/or services, including the sports application described above.

Fourth user device 140 may be a desktop computer, similar to the third user device 130 described above. Fourth user device 140 may belong to any of the users previously described, or, alternatively, to a fourth user, different from the previously describe users Like the third user device 130 discussed above, fourth user device 140 may comprise one or more web browsers that allow the fourth user to access the web platform corresponding to the sports application described herein.

Server 150 may be any server capable of executing application 152. In this regard, server 150 may be a stand-alone server, a corporate server, or a server located in a server farm or cloud-computer environment. According to some examples, server 150 may be a virtual server hosted on hardware capable of supporting a plurality of virtual servers. Additionally, server 150 may be communicatively coupled to first database 160.

Application 152 may be server-based software configured to provide users with access to data and/or information. Application 152 may be the server-based software that corresponds to the client-based software executing on the user devices described above (e.g., first user device 110, second user device 120, third user device 130, fourth user device 140, etc.). That is, application 152 may be the server-based software corresponding to the sports application described above. Additionally or alternatively, application 152 may be the web platform corresponding to the sports application described above. In this regard, application 152 may provide a homepage for one or more amateur and/or youth sports teams. The one or more homepages may allow a user to access a plurality of information associated with their respective sports team, such as game and/or practice schedules, contact information, etc. The one or more homepages may also include a social networking component that allows the coaches, managers, parents, and/or athletes to communicate and/or share content (e.g., images, photos, videos, GIFs, plays, etc.). Each of the one or more homepages may provide access to a playbook for the respective team. The playbook may include one or more plays (e.g., animated plays) for coaches, managers, parents, and/or athletes. The playbook may include a user interface that allows users (e.g., coaches, managers, parents, and/or athletes) to study (e.g., review) existing plays, create new plays, edit existing plays, share plays with others, comment or ask questions on existing plays, etc.

In addition to providing access to team pages, application 152 may generate a plurality of animations of plays created by users. For example, application 152 may receive a flat file from one or more user devices. The flat file may provide information associated with the play, including, for example, a name for the play, a type of sport, an indication of a playing field (e.g., athletic field), one or more players, a starting position for each of the players, an ending (finishing) position for each of the players, a location of a ball, movement of the ball, etc. Additionally, the flat file may include information about the device used to generate the play, such as the type of device, a display size of the device, a screen resolution of the device, etc. Using the flat file, application 152 may generate one or more animations of the play. The one or more animations may show the movement of each of the one or more players on the field. Additionally or alternatively, the one or more animations may show the movement of the ball on the field and/or amongst the one or more players. In some examples, application 152 may generate a plurality of animations of the play. Each of the plurality of animations of the play may be associated with a different user device, a different display size, a different display resolution, etc. By generating the plurality of animations of the play, application 152 may be able to respond to requests for the play from different user devices.

First database 160 may be configured to store information on behalf of application 152. The information may include, but is not limited to, team information (e.g., players, coaches, etc.), contact information, game schedule, practice schedule, content, the playbook, plays contained in the playbook, etc. First database 160 may include, but is not limited to relational databases, hierarchical databases, distributed databases, in-memory databases, flat file databases, XML databases, NoSQL databases, graph databases, and/or a combination thereof.

First network 170 may include any type of network. In this regard, first network 170 may include the Internet, a local area network (LAN), a wide area network (WAN), a wireless telecommunications network, and/or any other communication network or combination thereof. It will be appreciated that the network connections shown are illustrative and any means of establishing a communications link between the computers may be used. The existence of any of various network protocols such as TCP/IP, Ethernet, FTP, HTTP and the like, and of various wireless communication technologies such as GSM, CDMA, WiFi, and LTE, is presumed, and the various computing devices described herein may be configured to communicate using any of these network protocols or technologies. The data transferred to and from various computing devices in system 100 may include secure and sensitive data, such as confidential documents, customer personally identifiable information, and account data. Therefore, it may be desirable to protect transmissions of such data using secure network protocols and encryption, and/or to protect the integrity of the data when stored on the various computing devices. For example, a file-based integration scheme or a service-based integration scheme may be utilized for transmitting data between the various computing devices. Data may be transmitted using various network communication protocols. Secure data transmission protocols and/or encryption may be used in file transfers to protect the integrity of the data, for example, File Transfer Protocol (FTP), Secure File Transfer Protocol (SFTP), and/or Pretty Good Privacy (PGP) encryption. In many embodiments, one or more web services may be implemented within the various computing devices. Web services may be accessed by authorized external devices and users to support input, extraction, and manipulation of data between the various computing devices in the system 100. Web services built to support a personalized display system may be cross-domain and/or cross-platform, and may be built for enterprise use. Data may be transmitted using the Secure Sockets Layer (SSL) or Transport Layer Security (TLS) protocol to provide secure connections between the computing devices. Web services may be implemented using the WS-Security standard, providing for secure SOAP messages using XML encryption. Specialized hardware may be used to provide secure web services. For example, secure network appliances may include built-in features such as hardware-accelerated SSL and HTTPS, WS-Security, and/or firewalls. Such specialized hardware may be installed and configured in system 100 in front of one or more computing devices such that any external devices may communicate directly with the specialized hardware.

Figure 2:
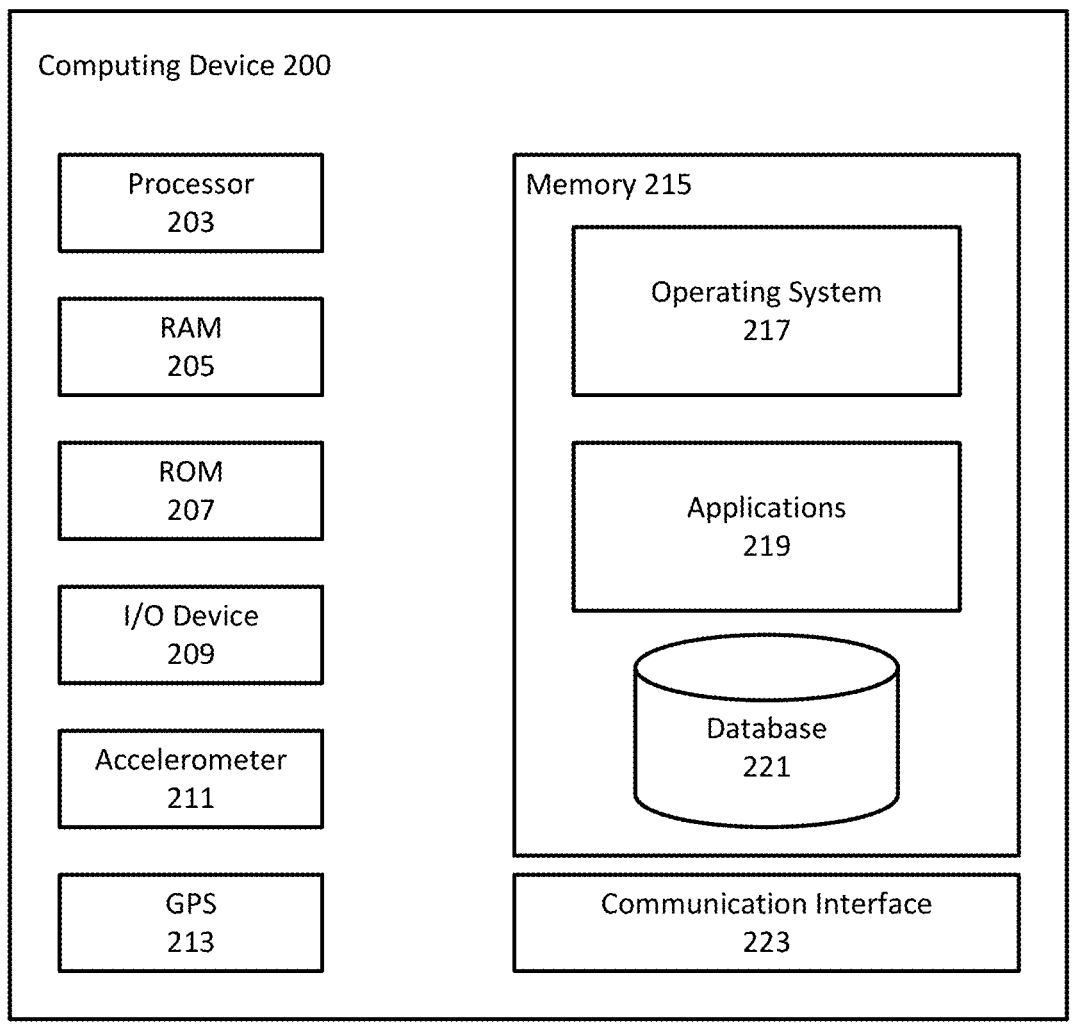
FIG. 2 shows an example computing device.

Any of the devices and systems described herein may be implemented, in whole or in part, using one or more computing devices described with respect to FIG. 2. Turning now to FIG. 2, a computing device 200 that may be used with one or more of the computational systems is described. The computing device 200 may comprise a processor 203 for controlling overall operation of the computing device 200 and its associated components, including RAM 205, ROM 207, input/output device 209, accelerometer 211, global-position system antenna 213, memory 215, and/or communication interface 223. A bus 202 may interconnect processor(s) 203, RAM 205, ROM 207, memory 215, I/O device 209, accelerometer 211, global-position system receiver/antenna 213, memory 215, and/or communication interface 223. Computing device 200 may represent, be incorporated in, and/or comprise various devices such as a desktop computer, a computer server, a gateway, a mobile device, such as a laptop computer, a tablet computer, a smart phone, any other types of mobile computing devices, and the like, and/or any other type of data processing device.

Input/output (I/O) device 209 may comprise a microphone, keypad, touch screen, and/or stylus through which a user of the computing device 200 may provide input, and may also comprise one or more of a speaker for providing audio output and a video display device for providing textual, audiovisual, and/or graphical output. Software may be stored within memory 215 to provide instructions to processor 203 allowing computing device 200 to perform various actions. For example, memory 215 may store software used by the computing device 200, such as an operating system 217, application programs 219, and/or an associated internal database 221. The various hardware memory units in memory 215 may comprise volatile and nonvolatile, removable and non-removable media implemented in any method or technology for storage of information such as computer-readable instructions, data structures, program modules, or other data. Memory 215 may comprise one or more physical persistent memory devices and/or one or more non-persistent memory devices. Memory 215 may comprise random access memory (RAM) 205, read only memory (ROM) 207, electronically erasable programmable read only memory (EEPROM), flash memory or other memory technology, optical disk storage, magnetic cassettes, magnetic tape, magnetic disk storage or other magnetic storage devices, or any other medium that may be used to store the desired information and that may be accessed by processor 203.

Accelerometer 211 may be a sensor configured to measure accelerating forces of computing device 200. Accelerometer 211 may be an electromechanical device. Accelerometer may be used to measure the tilting motion and/or orientation computing device 200, movement of computing device 200, and/or vibrations of computing device 200. The acceleration forces may be transmitted to the processor to process the acceleration forces and determine the state of computing device 200.

GPS receiver/antenna 213 may be configured to receive one or more signals from one or more global positioning satellites to determine a geographic location of computing device 200. The geographic location provided by GPS receiver/antenna 213 may be used for navigation, tracking, and positioning applications. In this regard, the geographic may also include places and routes frequented by the first user.

Communication interface 223 may comprise one or more transceivers, digital signal processors, and/or additional circuitry and software, protocol stack, and/or network stack for communicating via any network, wired or wireless, using any protocol as described herein.

Processor 203 may comprise a single central processing unit (CPU), which may be a single-core or multi-core processor, or may comprise multiple CPUs. Processor(s) 203 and associated components may allow the computing device 200 to execute a series of computer-readable instructions (e.g., instructions stored in RAM 205, ROM 207, memory 215, and/or other memory of computing device 215, and/or in other memory) to perform some or all of the processes described herein. Although not shown in FIG. 2, various elements within memory 215 or other components in computing device 200, may comprise one or more caches, for example, CPU caches used by the processor 203, page caches used by the operating system 217, disk caches of a hard drive, and/or database caches used to cache content from database 221. A CPU cache may be used by one or more processors 203 to reduce memory latency and access time. A processor 203 may retrieve data from or write data to the CPU cache rather than reading/writing to memory 215, which may improve the speed of these operations. In some examples, a database cache may be created in which certain data from a database 221 is cached in a separate smaller database in a memory separate from the database, such as in RAM 205 or on a separate computing device. For example, in a multi-tiered application, a database cache on an application server may reduce data retrieval and data manipulation time by not needing to communicate over a network with a back-end database server. These types of caches and others may provide potential advantages in certain implementations of devices, systems, and methods described herein, such as faster response times and less dependence on network conditions when transmitting and receiving data.

Although various components of computing device 200 are described separately, functionality of the various components may be combined and/or performed by a single component and/or multiple computing devices in communication without departing from the disclosure.

The present disclosure provides a portal that acts as a single point of contact for users associated with a sports team. The portal may include a playbook component that allows users to study (e.g., review) existing plays, create new plays, edit existing plays, share plays with others, comment or ask questions on existing plays, etc. FIG. 3 shows a flow chart of a process 300 for creating a play in accordance with one or more aspects of the disclosure. Some or all of the steps of process 300 may be performed using one or more computing devices as described herein, including, for example, a user device (e.g., first user device 110, second user device 120, third user device 130, fourth user device 140), a server (e.g., server 150), or a memory comprising a processor configured to performed the methods described herein.

In step 305, a computing device may receive an input indicating a request to create (e.g., generate) a play. As will be described in greater detail below with respect to FIGS. 4A-4F, a user may access a site associated with a sports team for example, via an application (e.g., the sports application described above) or a sports platform webpage accessible via a web browser. After accessing the team page, a user may navigate to a playbook page. The playbook page may include a plurality of plays that a user (e.g., coach, manager, player, athlete, parent, etc.) may access and/or edit. Additionally, the playbook page may include a button that allows the user to create new plays.

In step 310, the computing device may cause a playing field (e.g., athletic field) to be displayed. The playing field displayed may be based on the sport associated with the team. For example, if the team is a soccer team, the playing field may be a soccer pitch. The team may be a football team, a baseball team, a softball team, a lacrosse team, a basketball team, a volleyball team, an ice hockey team, a field hockey team, a cricket team, a rugby team, or any other suitable team sport. In some instances, individual sports, like gymnastics, may be managed through the homepage. Accordingly, the playing field displayed by the computing device may comprise a football field, a baseball field, a softball field, a soccer field (soccer pitch), a lacrosse field, a basketball court, a volleyball court, a tennis court, an ice hockey rink, a field hockey pitch, a cricket field, a rugby field, or any other equivalent field, rink, pitch, or arena.

In step 315, the computing device may divide the display into a plurality of datapoints. Dividing the display into a plurality of datapoints may comprise creating a cartesian plane on the display. Alternatively, a cartesian plane may be overlaid on the playing field, instead of the entire display. Additionally or alternatively, dividing the display into a plurality of datapoints may comprise assigning labels to individual pixels, or groups of pixels, of the displayed playing field. That is, individual pixels, or groups of pixels, may be used to create a plot of the playing field.

In step 320, the computing device may receive a selection of a player. In some examples, a user may select a starting formation, from a variety of starting formations, for the team. Additionally or alternatively, the user may select a starting formation for the opposing team. The starting formation for the opposing team may be selected from a plurality of starting formations. After selecting the starting formation, a plurality of players associated with a team may be displayed on the playing field. In some examples, the user may select an option to add a player. The user may add players one at a time. In some instances, the user may configure the starting formation (e.g., line-up) as each player is added to the playing field. After the players are added to the playing field, the user may select a first player, of the plurality of players, as part of the play creation.

In step 325, the computing device may receive an indication of an initial (e.g., starting) position of the selected player (e.g., the first player) on the playing field. The indication of the initial position may comprise one or more datapoints, of the plurality of datapoints. Additionally or alternatively, the initial position may comprise coordinates on the cartesian plane. In yet further examples, the initial position may comprise one or more pixels on the playing field where the first player is located. The computing device may store (e.g., record) an indication of the first player and the initial position of the first player in a memory, for example, to track the players and their movements during the play. Additionally or alternatively, the indication of the first player and the initial position may be written to a file that may be used to generate an animation of the play.

In step 330, the computing device may receive an indication of an intermediary position of the selected player on the playing field. In some examples, a user may draw a line from the initial position to the intermediary position. In other examples, the user may drag-and-drop the selected player from the initial position to the intermediary position. In further examples, the user may drop a pin (e.g., point) at the intermediary position. The intermediary position may be indicated via one or more datapoints, cartesian coordinates, pixels of the playing field, or any equivalent thereof. Like the initial position, the intermediary position may be stored (e.g., recorded) in the memory to continue tracking the first player's movement. As noted above, the intermediary position may be written to the file used to generate an animation of the play.

In step 335, the computing device may receive an indication of a final (e.g., ending) position of the selected player on the playing field. The final position of the selected player may be determined using any of the techniques described above, including, for example, the drag-and-drop technique, the line drawing technique, the pin dropping technique, etc. Similarly, the final position of the selected player may comprise one or more datapoints, cartesian coordinates, pixels of the playing field, or any equivalent thereof. The computing device may store (e.g., record) the final position of the selected player in the memory as part of tracking the first player's movement. Further, the final position may be written to the file to record the first player's movements during the play and recreate those movements via an animation of the play.

While the example above described a play with a first player having a starting point, an intermediary point, and an ending point, it will be appreciated that the first player may only have a starting point and an ending point. That is, the first player may move in a straight line between two points as part of the play. Conversely, the first player may have multiple intermediary points, during a play, before reaching the ending point. Each of these points may be recorded in a memory and/or written to a file to track the first player's movement.

In step 340, the computing device may determine whether any additional players are selected during the play. If so, the method 300 returns to step 320 and the starting, intermediary, and/or ending position of each player may be recorded during the play. This process may repeat for each player on the playing field during the play. When the location(s) and/or movement of each player has been recorded, the play creation process may advance to step 345.

In step 345, the computing device may receive an indication of an initial location of a ball (or puck). Like the initial position of the first player, the indication of the initial location of the ball may comprise one or more datapoints, of the plurality of datapoints. Additionally or alternatively, the initial location of the ball may comprise coordinates on the cartesian plane and/or one or more pixels on the playing field where the ball is located. The computing device may store (e.g., record) an indication of the ball and the initial location of the ball in a memory, for example, to track the ball's movement during the play. Additionally or alternatively, the indication of the ball and its initial location may be written to a file that may be used to generate an animation of the play.

In step 350, the computing device may receive an indication of an intermediary location of the ball. Like the movements of the player, a line may be drawn to show the movement of the ball from the initial location to the intermediary location. Additionally or alternatively, the ball may be dragged-and-dropped from the initial location to the intermediary location. In further examples, the user may drop a pin (e.g., point) at the intermediary location of the ball. The intermediary location of the ball may be indicated via one or more datapoints, cartesian coordinates, pixels of the playing field, or any equivalent thereof. Similarly, the intermediary location may be stored (e.g., recorded) in the memory and/or written to a file to continue tracking the movement of the ball.

In step 355, the computing device may receive an indication of a final (e.g., ending) location of the ball. The final location of the ball may be determined using any of the techniques described above, including, for example, the drag-and-drop technique, the line drawing technique, the pin dropping technique, etc. Similarly, the final location of the ball may comprise one or more datapoints, cartesian coordinates, pixels of the playing field, or any equivalent therefore. The computing device may store (e.g., record) the final location of the ball in the memory and/or write the final location of the ball to a file.

While the example above described the ball having a starting point, an intermediary point, and an ending point during the play, it will be appreciated that the ball may only have a starting point and an ending point. Alternatively, the ball may have a plurality of intermediary points during the play. Each of the points may be recorded in a memory and/or written to a file to track the ball's movement.

In step 360, the computing device may generate a flat file. The flat file may be used to generate an animation of the play. The flat file may track each of the players during a play, each player's movements (e.g., through a series of datapoints), the ball, and/or the ball's movements (e.g., through a series of datapoints). Additionally or alternatively, the flat file may provide additional information associated with the play, including, for example, a name for the play, a type of sport, an indication of a playing field, etc. The flat file may also include information about the device used to generate the play, such as the type of device, a display size of the device, a screen resolution of the device, etc. The flat file may be a text file, a comma-separated values (CSV) file, a JavaScript Object Notation (JSON) file, or any equivalent thereof. The use of the flat file produces a small file, typically less than one (1) megabyte. This allows the flat file to be transmitted over cellular, or other low bandwidth, communication networks, thereby allowing coaches, managers, players, athletes, and/or parents to share the play on their mobile devices when connectivity is low.

In step 365, the computing device may send the flat file to a server. The computing device may send the flat file to the server via an application programming interface (API), such as REST API. As noted above, the server, or an application executing on the server, may generate an animation of the play using the flat file. The animation may be created based on the information contained in the flat file. As noted above, the flat file may comprise one or more of a name for the play, a type of sport, an indication of a playing field, one or more players, a starting position for each of the players, an ending (finishing) position for each of the players, a location of a ball, movement of the ball, the type of device used to create the play, a display size of the device used to create the play, a screen resolution of the device used to create the play, etc. Based on this information, the server may generate an animation of the play. Like the flat file, the animation may be a relatively small file, and certainly smaller than a video file. This allows the animation to be shared amongst users when connectivity is low and/or unreliable. Additionally, the animation improves over existing solutions, which provide videos of the play. The videos consume a significant amount of bandwidth, making them ill-suited for low connectivity locations, such as playing fields. Additionally, videos may consume a significant amount of memory on a device, thereby making them undesirable.

In step 370, the computing device may receive an animation of the play from the server. The computing device may receive the animation of the play from the server via an API. The API may be the same API used to send the flat file to the server. Additionally or alternatively, the animation of the play may be received via an electronic communication, such as an email, a text message, a short message service (SMS) message, a multimedia messaging service (MMS) message, or any equivalent thereof. The animation of the play may be added to an existing playbook associated with the team. In some instances, the computing device may download the animation of the play directly to the computing device. The animation of the play may be saved to the computing device. The animation of the play may be viewed, for example, using a native application (e.g., the sports application). Downloaded and saved plays may be viewed in an offline mode. That is, the sports application may work offline and/or without an internet connection. While downloaded and saved plays may be viewed in an offline mode, the user may not be able to download and/or save new plays.

In step 375, the computing device may cause the animation of the play to be displayed on the computing device. The animation of the play may be displayed, for example, via the sports application located on the computing device. Additionally or alternatively, the animation of the play may be displayed in a web browser. In some examples, the animation of the play may be downloaded and/or saved on the computing device and displayed via an application configured to render, reproduce, or, otherwise, play the animation.

While the examples disclosed above describe the computing device sending a flat file to a server so the server can render an animation of the play, it will be appreciated that the computing device may operate in an offline mode. During the offline mode, steps 365 and 370 may be skipped. Instead, the computing device may generate the animation. In the offline mode, the computing device may share the animation of the play with other users using a short-range wireless communication protocol, such as near field communication (NFC), Bluetooth®, Bluetooth® Low Energy, Wi-Fi, ANT, LoRa, Zig Bee, or an equivalent thereof. As noted above, the offline mode and/or the use of short-range wireless protocols allows the animation to be shared amongst users when connectivity is low and/or unreliable.

Figure 3A:
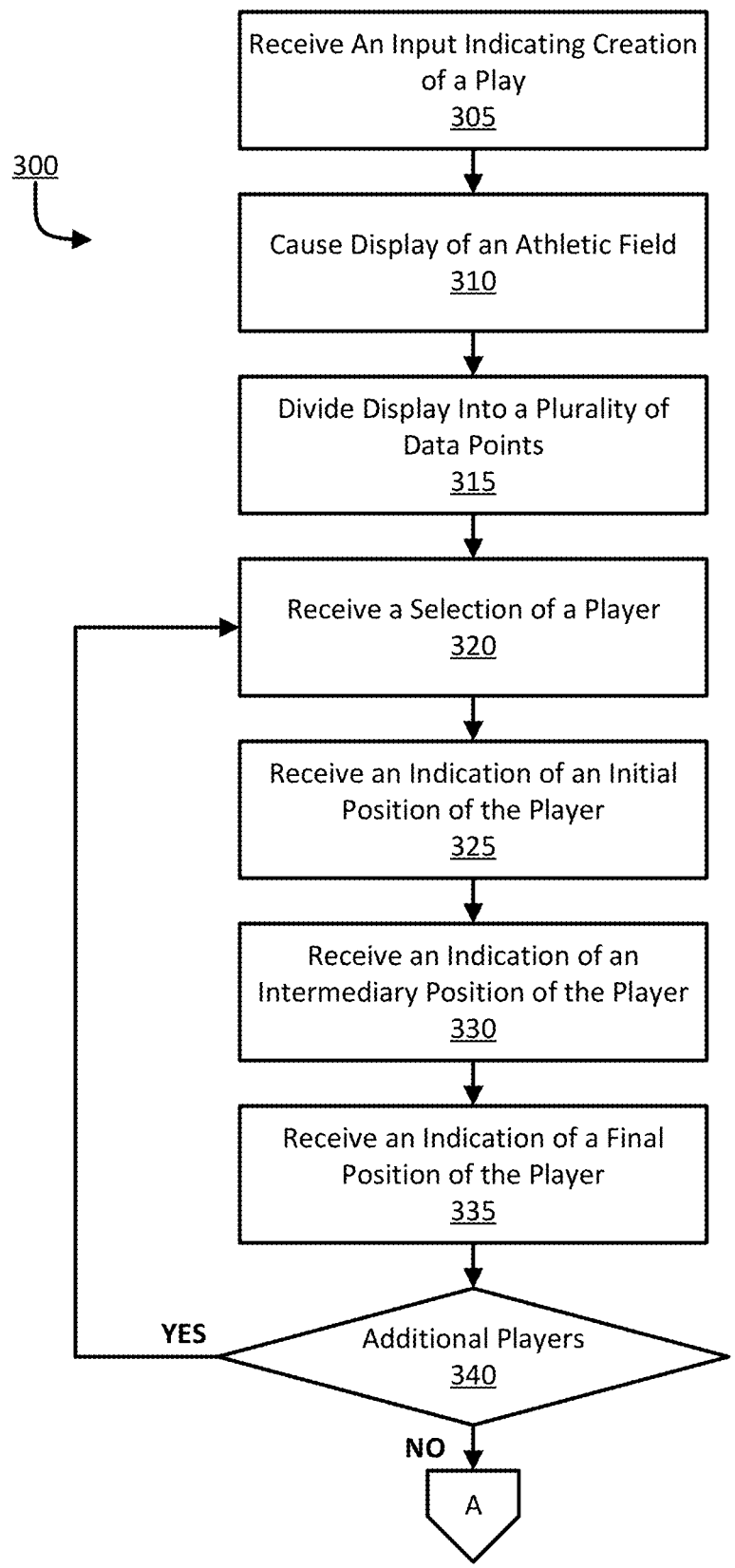
FIGS. 3A-3B show an example of a process for creating a play according to one or more aspects of the disclosure.
Figure 3B:
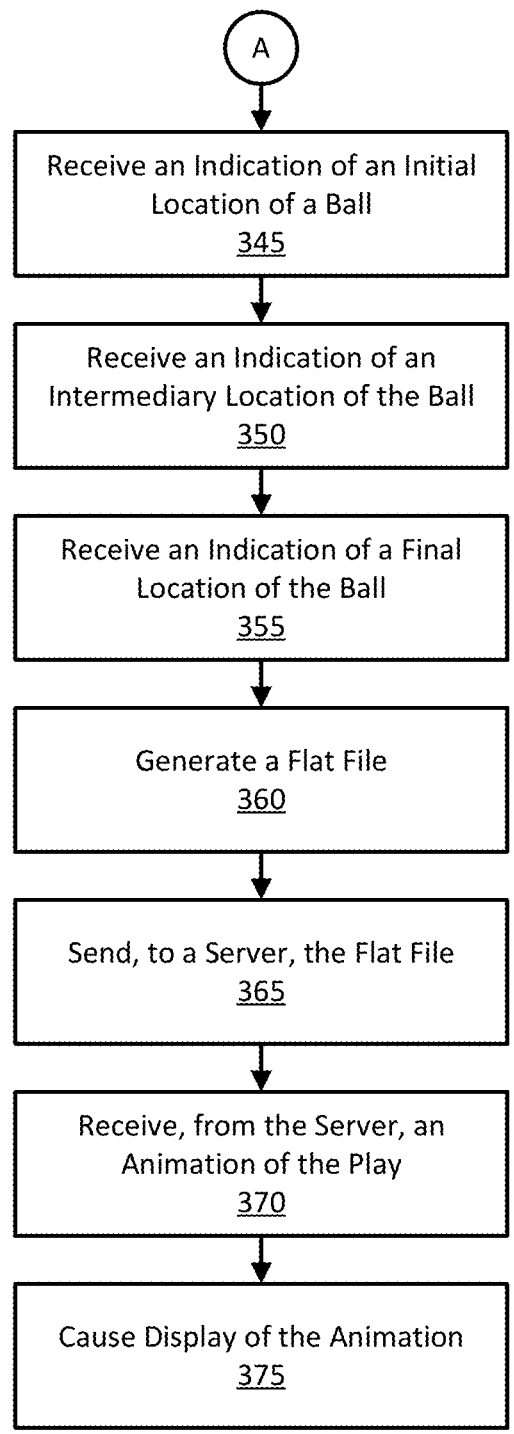

Further, it will be appreciated that the order of the steps performed in FIGS. 3A and 3B may be skipped and/or re-arranged. For example, the movement of a ball during a play may occur before the movement of the players. In this regard, the team may be a baseball team and the play may be created to show where the players are supposed to move in response to the ball being hit. Additionally, the play may show the movement of the opposing team. That is, steps 320-340 may be used to illustrate (show) the movement of the opposing team, for example, in response to the play.

In some instances, the process described in FIGS. 3A and 3B may be used to show real-time plays, as they are occurring during a game. In this regard, the user may create the play using the techniques described above. The play may be rendered in real-time for other participants to view and/or track the progress of the game.

FIGS. 4A-4F show examples of a web interface for creating a play in accordance with one or more aspects of the disclosure. While FIGS. 4A-4F show a web interface, it will be appreciated that the interface may be a user interface associated with a native application located on a user device (e.g., mobile device, smart phone, tablet, etc.).

Figure 4A:
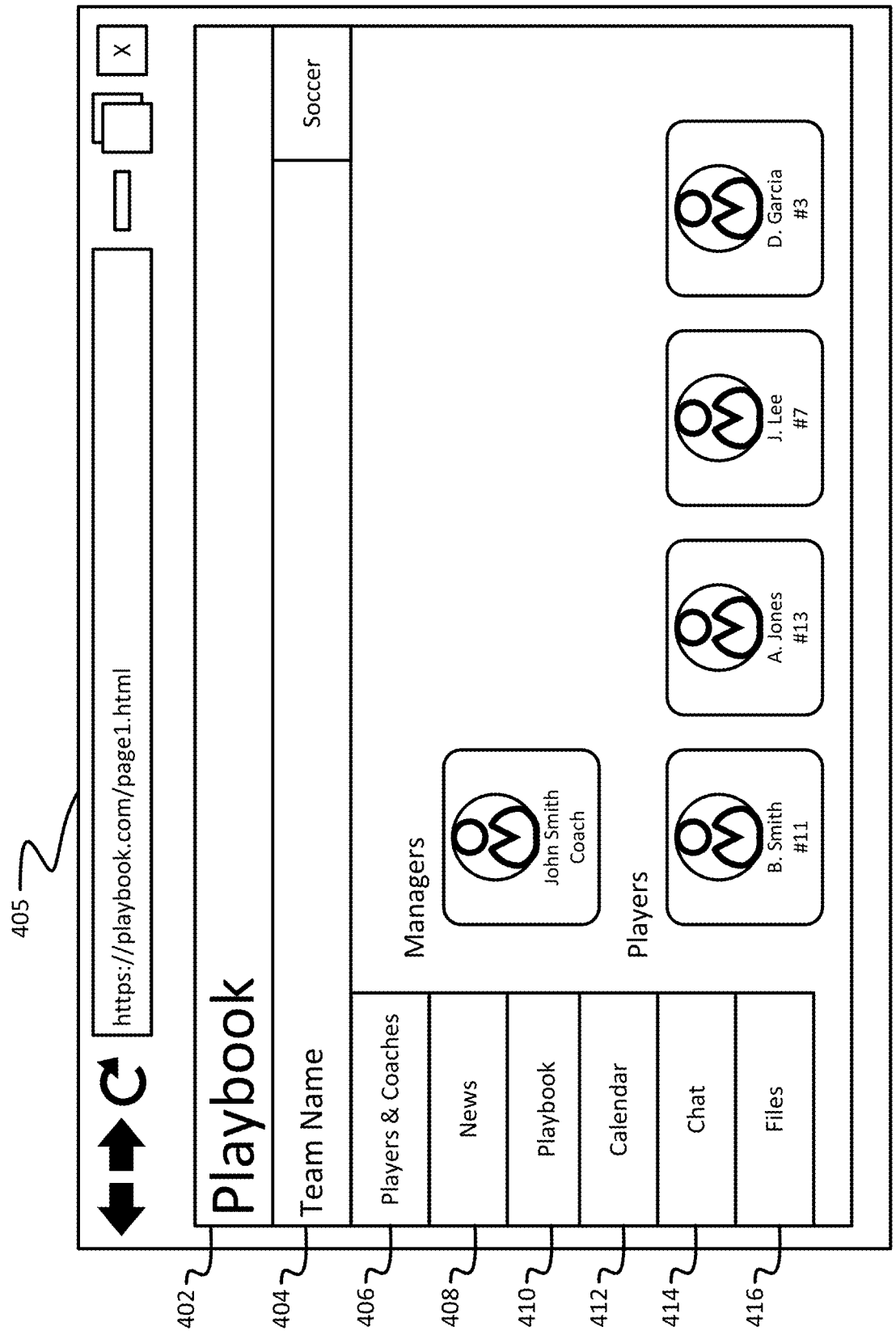
FIGS. 4A-4F show examples of a web interface for creating a play according to one or more aspects of the disclosure.

FIG. 4A shows a web browser 405. Web browser 405 may display a homepage for the amateur and/or youth sports team. The homepage may be displayed, for example, after a user logs in (i.e., provides authentication credentials) to a web platform. The homepage may identify the name of the service in banner 402. In header 404, the team name and/or sport may be indicated. The examples illustrated in FIGS. 4A-4F correspond to a soccer team. It will be appreciated that the team could be any type of team, including, for example, a soccer team, the playing field may be a soccer pitch. The team may be a football team, a baseball team, a softball team, a lacrosse team, a basketball team, a volleyball team, an ice hockey team, a field hockey team, a cricket team, a rugby team, or any other suitable team sport. In some instances, individual sports, like gymnastics, may be managed through the homepage. The homepage also includes a plurality of buttons on the left side of the homepage, including Players & Coaches button 406, News button 408, Playbook button 410, Calendar button 412, Chat button 414, and/or Files button 416. Selecting the Players & Coaches button 406 may cause a roster of players and/or coaches to be displayed. In some examples, the roster may also include contact information, such as email address and/or phone number. The roster may also include personal information, such as the player's date of birth, parent and/or guardian information, address information, etc. Selecting the News button 408 may cause news and/or recent announcements to be displayed via browser 405. Selecting the Playbook button 410 may cause a listing of plays to be displayed. Selecting Calendar button 412 may cause game and/or practice schedules to be displayed. Selecting the Chat button 414 may allow the user to communicate with teammates and/or coaches. Communications may include messaging, instant messaging, e-mail, and the like. Finally, selecting the Files button 416 may cause one or more files, such as team policies, league policies, league rules, etc., to be displayed. For the purposes of this disclosure, the user may select Playbook button 410.

Figure 4B:
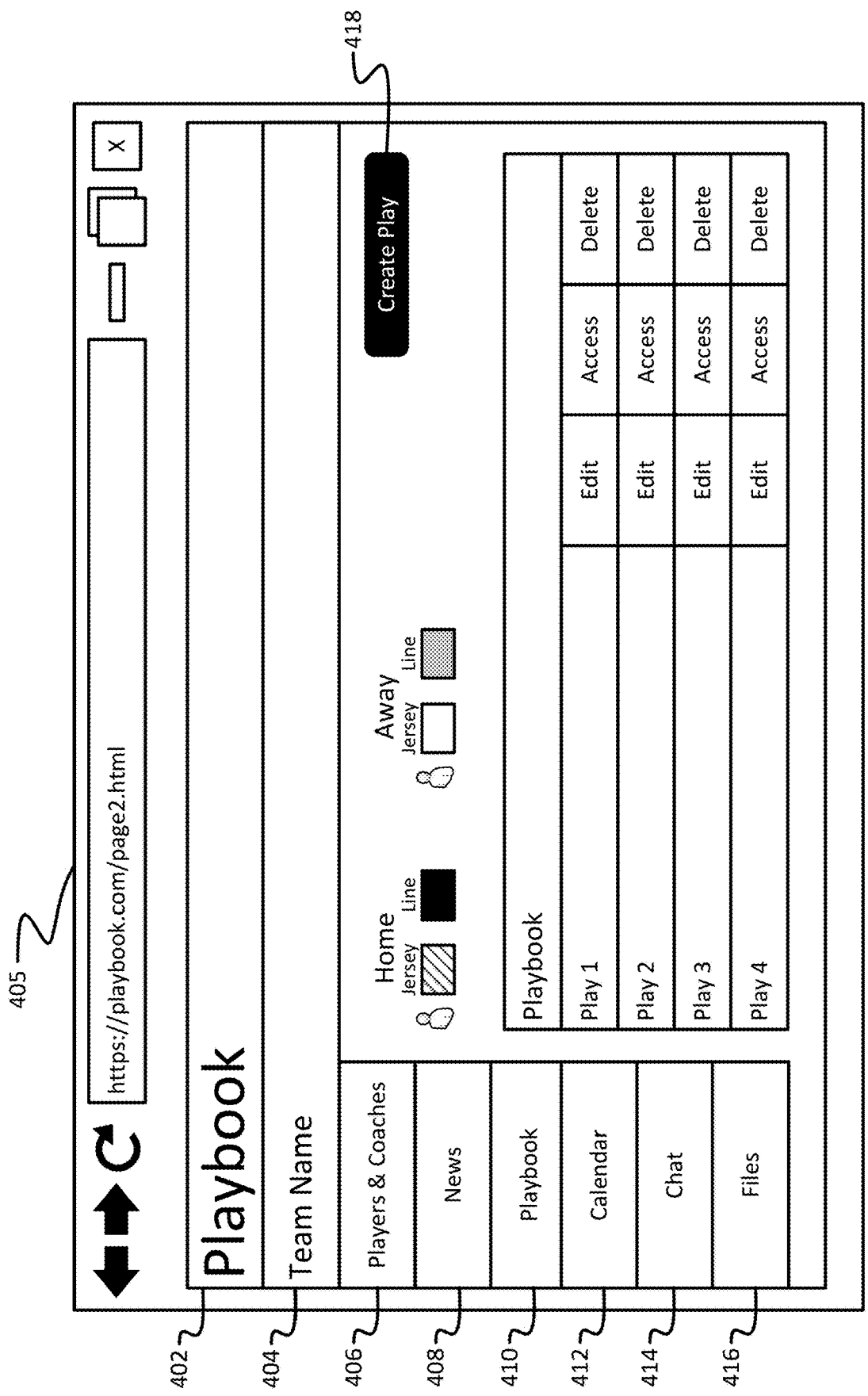

FIG. 4B shows an example of a playbook page. The playbook page illustrated in FIG. 4B is similar to the homepage shown in FIG. 4A. However, instead of displaying roster information, a listing of plays is shown. The user may select one or more plays from the listing of plays. For example, the user may select to view (e.g., access) a first play (e.g., "Play 1"). In another example, the user may select an edit option, which would allow the user to edit an existing play. In yet a further example, the user may select a delete option, which would allow the user to delete (e.g., remove) an existing play. The delete option may only be available to coaches and/or managers, and not to athletes and/or players. Alternatively, users may only have permission to edit and/or delete plays that the user created. As shown in FIG. 4B, the playbook page may allow a user to select how players on the home team are displayed in the various plays. Additionally, the user may select the color for the home team's jersey and/or the lines showing the players movements. Similarly, the user may define how visiting team players are shown and what color the visiting team is associated with. Playbook page may also include a Create Play button 418. Create Play button 418 may allow a user to create a new play.

Figure 4C:
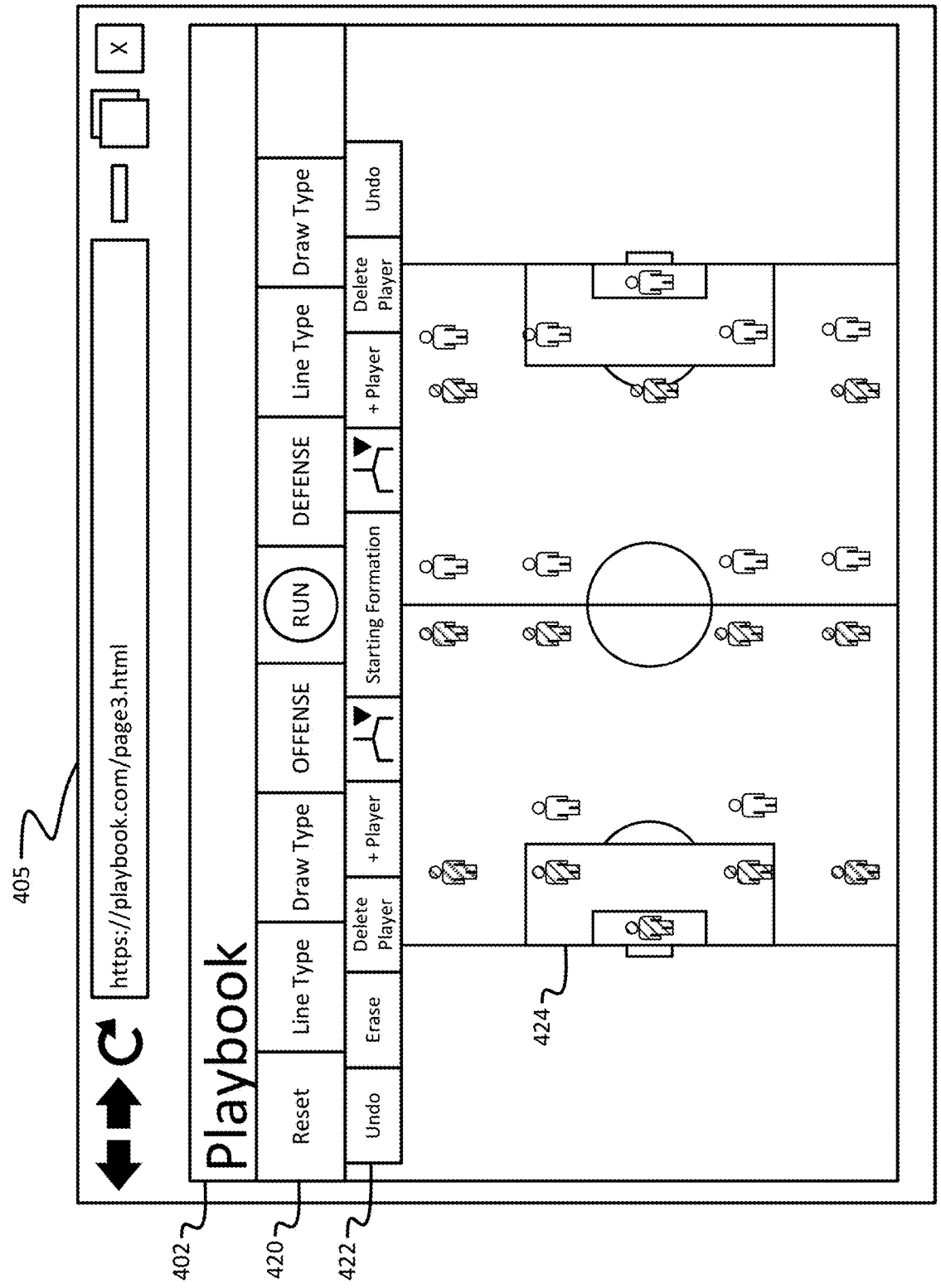

When a user selects the Create Play button 418, a Play Creation page, like the one shown in FIG. 4C, may be displayed. The Play Creation page may show a playing field 424. Additionally, the Play Creation page may comprise a first banner of options 420 and a second banner of options 422. The first banner of options 420 may comprise a number of options for configuring how information is displayed on playing field 424. For example, the first banner of options 420 may allow a user to define a line type and/or a draw type for the offensive team. The first banner of options 420 may have the same options for the defensive team, as well. First banner of options 420 may also include a run button, which would allow an animation of a play to be displayed.

The second banner of options 422 may allow a user to configure starting formations for the offensive team and/or the defensive team. Additionally or alternatively, second banner of options 422 may allow a user to add players one-by-one. The user can then arrange a starting formation as they see fit. Second banner of options 422 may also allow a user to delete a player, erase the entire playing field 424, and/or undo a recent addition, change, modification, and/or alteration. Second banner of options 422 may allow the user to define the starting formation for both teams and/or the initial position for each player.

Figure 4D:
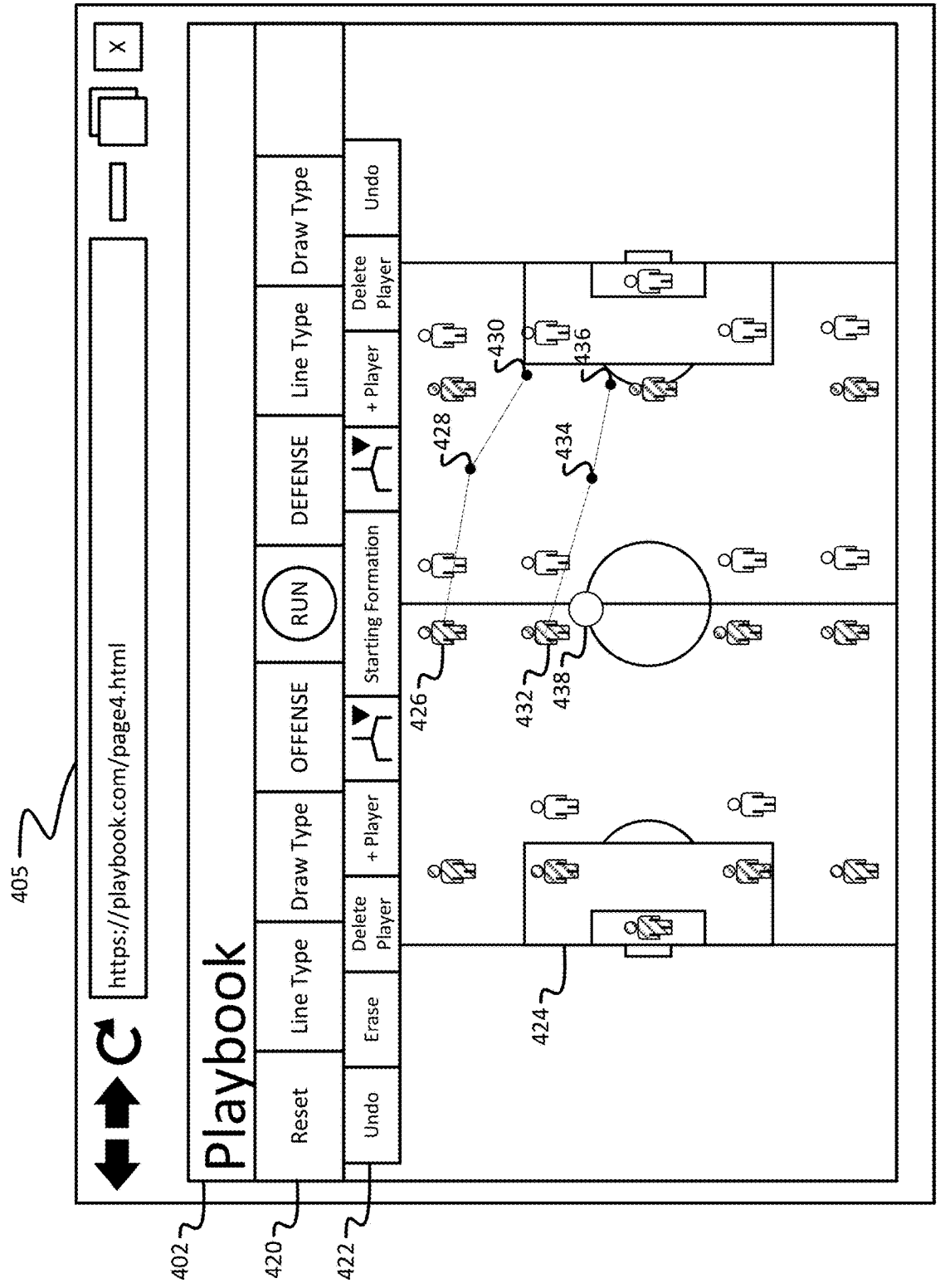

FIG. 4D shows an example of a play being created. As shown in FIG. 4D, the Play Creation page may include first player 426, second player 432, and/or ball 438. The initial position for first player 426, second player 432, and/or ball 438 may be determined by the starting formation originally set by the user. As described above, the user may define an intermediary point and/or an ending point for both first player 426 and/or second player 438. As shown in FIG. 4D, the user has defined an intermediary point 428 and a finishing point 430 for first player 426. Similarly, the user has defined an intermediary point 434 and a finishing point 436. Ball 438 is shown in the possession of second player 432. In this regard, the movement of ball 438 may be defined in FIG. 4D, or a subsequent interface.

Figure 4E:
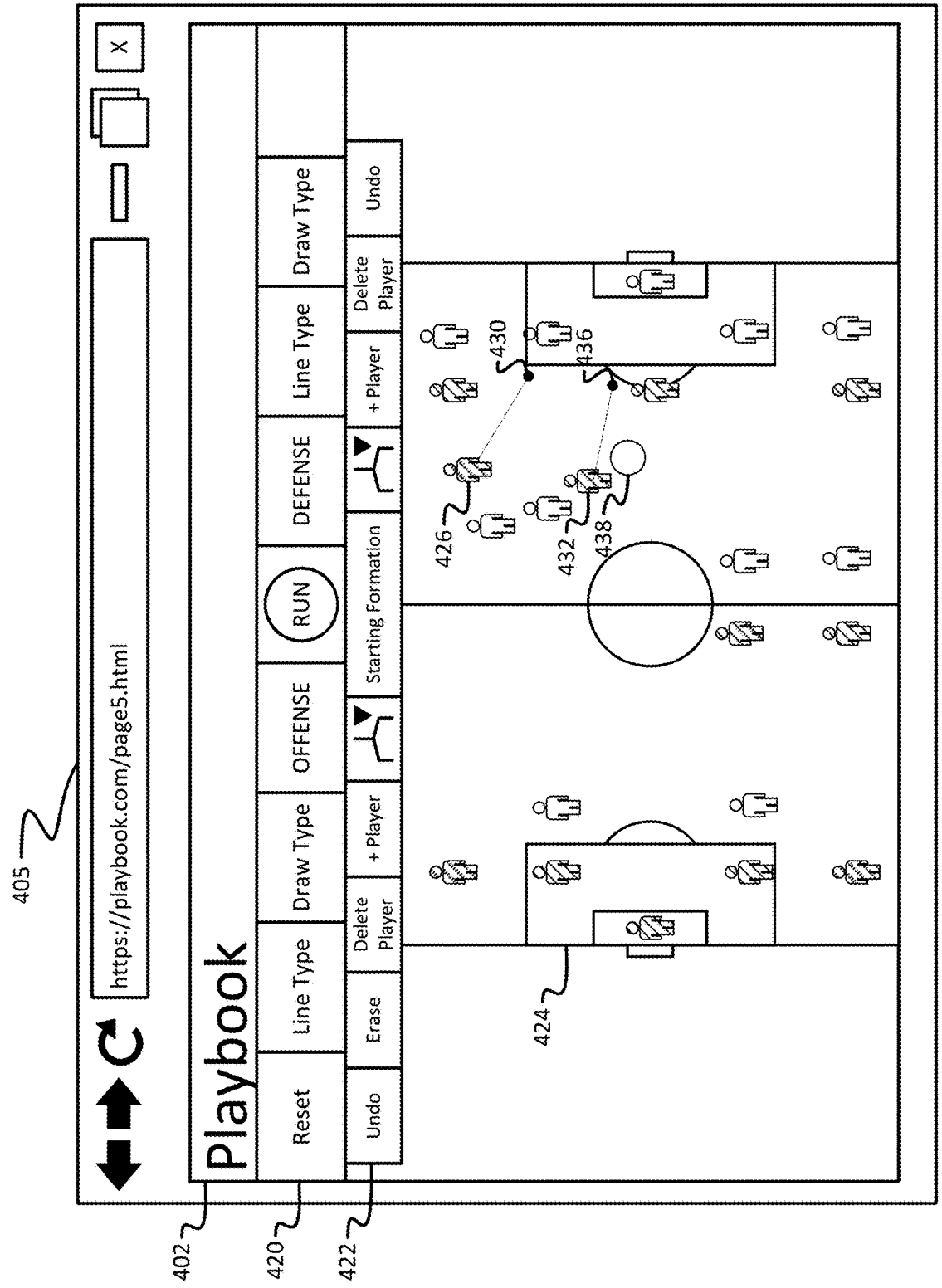
Figure 4F:
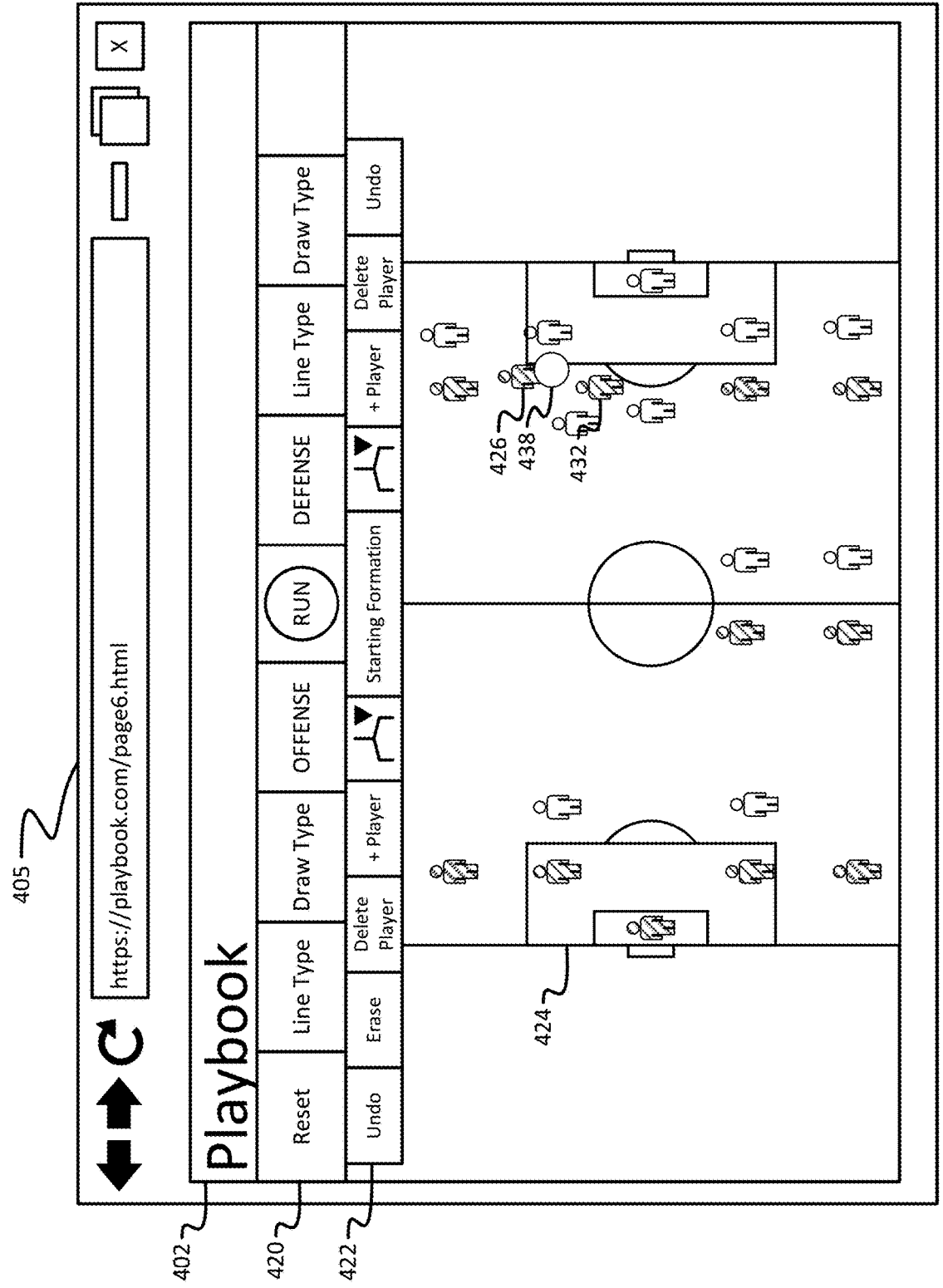

Once the movement of the players and/or the ball is defined, the user may press the "Run" button in the first banner of options 420. As shown in FIG. 4E, first player 426 advances to intermediary point 428 and second player 432 advances to intermediary point 434 in response to the "Run" button being pressed. Ball 438 may remain in possession of second player 432. As the play advances, first player 426 advances to finishing point 430 and second player 432 advances to finishing point 436, as shown in FIG. 4F. Additionally, ball 438 passes from second player 432 to first player 426.

The example shown in FIGS. 4A-4F is merely illustrative. For the sake of brevity, only two players and the ball are shown moving. A complete play may show all of the players, on both teams, moving. Additionally, it will be appreciated that the example shown in FIGS. 4A-4F may be applicable to any team sport.

Figure 5:
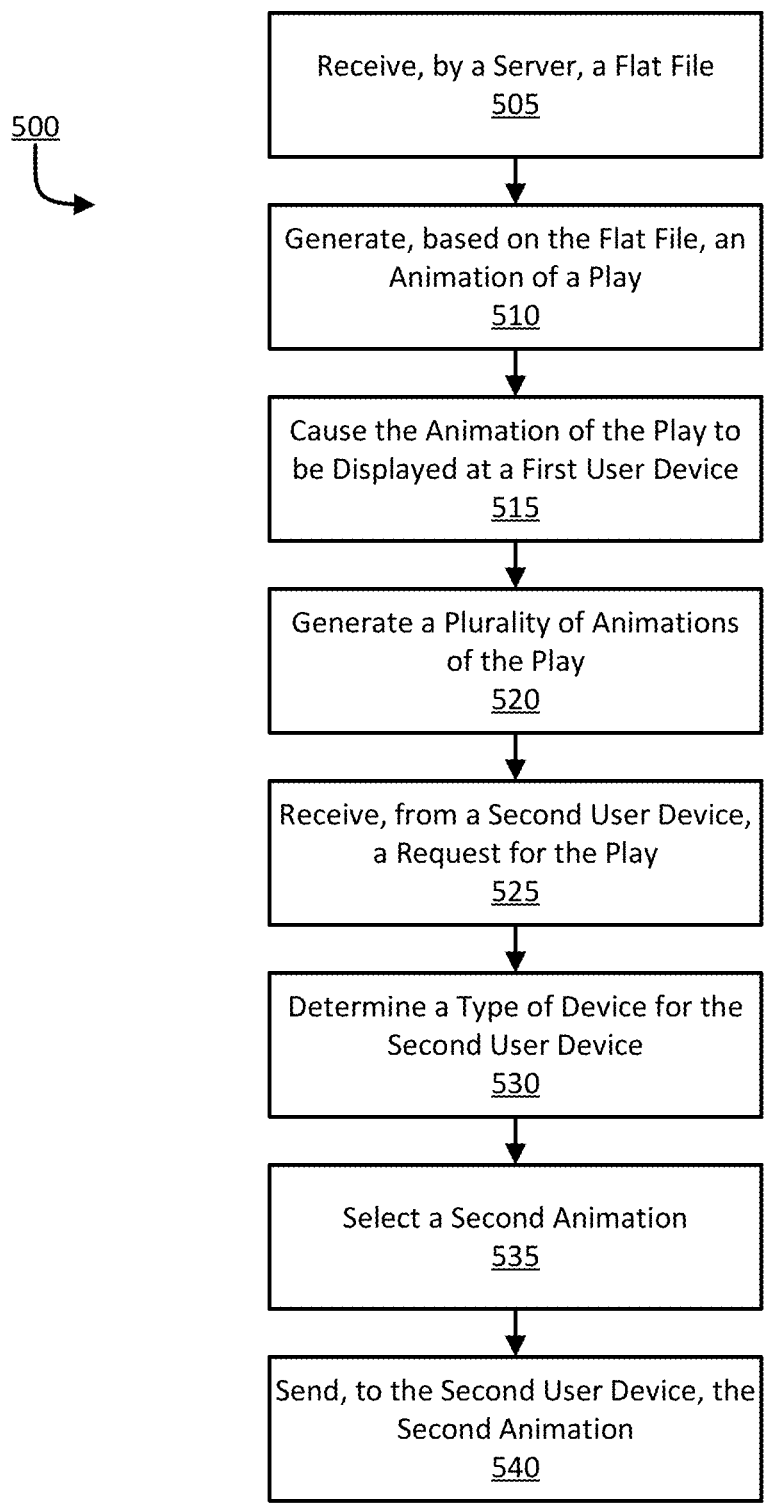
FIG. 5 shows an example of a process for generating one or more animations of a play according to one or more aspects of the disclosure.

FIG. 5 shows a flow chart of a process 500 for generating one or more animations of a play in accordance with one or more aspects of the disclosure. Some or all of the steps of process 500 may be performed using one or more computing devices as described herein, including, for example, a user device (e.g., first user device 110, second user device 120, third user device 130, fourth user device 140), a server (e.g., server 150), or a memory comprising a processor configured to performed the methods described herein.

In step 505, a server (e.g., application 152 executing on server 150) may receive a flat file. The flat file may be received from a user device and/or an application executing on the user device. In some examples, the server may receive the flat file from the application executing on the user device via an application programming interface (API), such as REST API.

In step 510, the server may generate an animation of the play, for example, based on the flat file. The flat file may comprise one or more of a name for the play, a type of sport, an indication of a playing field, one or more players, a starting position for each of the players, an ending (finishing) position for each of the players, a location of a ball, movement of the ball, the type of device used to create the play, a display size of the device used to create the play, a screen resolution of the device used to create the play, etc. Based on this information, the server may generate an animation of the play. The animation may be a relatively small file, conducive to being shared via short-range wireless protocols and/or during periods of low connectivity (like those found at, or around, playing fields).

In step 515, the server may cause the animation of the play to be displayed at a first user device. As noted above, the server may send the animation of the play to the first user device, for example, via an API. Additionally or alternatively, the animation of the play may be sent via an electronic communication, such as an email, a text message, a short message service (SMS) message, a multimedia messaging service (MMS) message, or any equivalent thereof. An application on the first user device may render, reproduce, and/or play the animation. Additionally or alternatively, the animation may be rendered, reproduced, and/or played via a web browser on the first user device.

In step 520, the server may generate a plurality of animations of the play. Each of the plurality of animations may be associated with a different device, a different screen size, and/or a different display (e.g., screen) resolution. The server may generate the plurality of animations such that the play can be viewed on a variety of devices and/or a variety of displays. In some examples, one animation, of the plurality of animations, may transform the size of the play so that the play may be viewed on displays with different sizes and/or resolutions than the display of the device used to create the play. For example, the play may be created on a mobile device, which may have fewer datapoints than a display of a tablet device and/or a monitor associated with a desktop computer. The server may convert and/or scale the datapoints associated with the playing field, the players, and/or the ball to a larger display, such that the play is rendered, reproduced, and/or played properly on the larger display of a tablet and/or desktop computer. The server may also convert and/or scale the datapoints associated with the playing field, the players, and/or the ball for smaller displays.

In step 525, the server may receive a request for the play from a second user device. The second user device may be a different device belonging to the same user that created the play. Alternatively, the second user device may be associated with a second user, different from the user that created the play. The request may be received via an application executing on the second user device, for example, through an API call. Additionally or alternatively, the request may be received from a web browser executing on the second user device. For example, the request may be an HTTP Method (e.g., HTTP GET) that identifies the name and/or location of the requested play.

In step 530, the server may determine a type of device for the second user device, for example, in response to receiving the request for the play. In some examples, the request for the play may include one or more identifiers associated with the second user device. Additionally or alternatively, the request for the play may include one or more identifiers associated with the second user. The second user may register with the server and, as part of the registration process, identify the second user device. The second user device may be stored in a memory (e.g., database) associated with the server. The server may query the memory to determine what type of device the second user is using.

In step 535, the server may select a second animation of the play. The second animation may be selected based on the type of device of the second user device. For example, the second animation may be configured to be displayed on a tablet device. Accordingly, the server may select the second animation that is configured to be displayed on a tablet device based on a determination that the second user device is a tablet device.

In step 540, the server may send the second animation to the second user device. As noted above, the server may send the second animation to the second user device via an API. In some instances, the second animation may be sent via an electronic communication, such as an email, a text message, an SMS message, an MMS message, or any equivalent thereof. In further examples, the second animation may be provided via a different HTTP Method that would allow the second animation to be displayed via a web browser executing on the second user device. Upon receiving the second animation, an application on the second user device may render, reproduce, and/or play the animation.

The above-described systems, devices, and methods may improve the creation and/or distribution of media files, such as animated plays. In this regard, the use of a flat file produces a file with a small memory footprint (e.g., <1 megabyte) that allows the flat file to be transmitted over cellular, or other low bandwidth, communication networks, thereby allowing coaches, managers, players, athletes, and/or parents to communicate the play via their mobile devices when connectivity is low. Additionally, the flat file may allow a server to generate an animation of a play, which may be distributed via short-range wireless protocols and/or during periods of low connectivity (like those found at, or around, playing fields).

One or more features discussed herein may be embodied in computer-usable or readable data and/or computer-executable instructions, such as in one or more program modules, executed by one or more computers or other devices as described herein. Program modules may comprise routines, programs, objects, components, data structures, and the like. that perform particular tasks or implement particular abstract data types when executed by a processor in a computer or other device. The modules may be written in a source code programming language that is subsequently compiled for execution, or may be written in a scripting language such as (but not limited to) Python, PERL, or any equivalent thereof. The computer executable instructions may be stored on a computer readable medium such as a hard disk, optical disk, removable storage media, solid-state memory, RAM, and the like. The functionality of the program modules may be combined or distributed as desired. In addition, the functionality may be embodied in whole or in part in firmware or hardware equivalents such as integrated circuits, field programmable gate arrays (FPGA), and the like. Particular data structures may be used to more effectively implement one or more features discussed herein, and such data structures are contemplated within the scope of computer executable instructions and computer-usable data described herein. Various features described herein may be embodied as a method, a computing device, a system, and/or a computer program product.

Although the present disclosure has been described in terms of various examples, many additional modifications and variations would be apparent to those skilled in the art. In particular, any of the various processes described above may be performed in alternative sequences and/or in parallel (on different computing devices) in order to achieve similar results in a manner that is more appropriate to the requirements of a specific application. It is therefore to be understood that the present disclosure may be practiced otherwise than specifically described without departing from the scope and spirit of the present disclosure. Although examples are described above, features and/or steps of those examples may be combined, divided, omitted, rearranged, revised, and/or augmented in any desired manner. Thus, the present disclosure should be considered in all respects as illustrative and not restrictive. Accordingly, the scope of the disclosure should be determined not by the examples, but by the appended claims and their equivalents.

What is claimed is:

1. A method for generating an animation of a play by a server, the method comprising:

receiving, by the server from an application executing on a first device and via a first application programming interface, a flat file, wherein the flat file comprises an indication of a playing field, an indication of a first player, one or more first datapoints, of a plurality of datapoints, associated with a starting position of the first player, and one or more second datapoints, of the plurality of datapoints, associated with a finishing position of the first player;

generating, by the server and using the flat file, a first animation of a play;

generating, by the server, a second animation of the play, wherein the second animation of the play is configured to be displayed on a second device that is different than the first device;

receiving, by the server via a social networking portal, one or more comments regarding the play;

receiving, by the server from an application executing on a third device, a request for the play;

querying, by the server, a database to determine a type of device for the third device;

selecting, by the server and based on a determination of the type of device for the third device, the second animation; and sending, by the server to the application executing on the third device and via a second application programming interface, the second animation and the one or more comments, wherein the third device is configured to share the second animation and the one or more comments via a short-range wireless communication protocol while in an offline mode.

2. The method of claim 1, wherein the flat file further comprises an indication of a second player, one or more third datapoints, of the plurality of datapoints, associated with a starting position of the second player, and one or more fourth datapoints, of the plurality of datapoints, associated with a finishing position of the second player.

3. The method of claim 2, wherein the first animation of the play illustrates the first player moving from the starting position to the finishing position and the second player moving from a second starting position to a second finishing position.

4. The method of claim 1, wherein generating the second animation of the play further comprises:

scaling, by the server and based on a display size associated with the second device, the plurality of datapoints.

5. The method of claim 1, further comprising:

generating, by the server, a plurality of animations of the play, wherein each of the plurality of animations of the play is associated with a different display size.

6. The method of claim 1, further comprising:
generating, by the server, a plurality of animations of the play, wherein each of the plurality of animations of the play is associated with a different display resolution.

7. The method of claim 1, wherein the plurality of datapoints comprise one or more coordinates on a cartesian plane.

8. A system comprising:
a first user device;
a second user device; and
a server,
wherein the first user device is configured to:
divide a display of the first user device into a plurality of datapoints;
receive a selection of a first player on a playing field;
receive a first indication of a starting position of the first player, wherein the first indication of the starting position comprises one or more first datapoints of the plurality of datapoints;
receive a second indication of a finishing position of the first player, wherein the second indication of the finishing position comprises one or more second datapoints of the plurality of datapoints;
generate a flat file, wherein the flat file comprises an indication of the playing field, an indication of the first player, the one or more first datapoints of the plurality of datapoints, and the one or more second datapoints of the plurality of datapoints;
send, to the server, the flat file;
receive, from the server, an animation of a play;
store the animation of the play;
detect, after receiving the animation of the play from the server, low connectivity;
enter, based on detecting low connectivity, an offline mode;
cause, while in the offline mode, display of the animation of the play; and
send, while in the offline mode and using a short-range wireless communication protocol, the animation of the play to the second user device; and
wherein the server is configured to:
receive, via an application programming interface, the flat file;
generate, using the flat file a plurality of animations of the play, wherein each of the plurality of animations is based on at least one of: a display size associated with a user device; or a display resolution associated with a user device;
receive, via a social networking portal, one or more comments regarding the play;
send, to the first user device via the application programming interface, a first animation of the play and the one or more comments; and
receive, from a third user device, a request for the play;
generate, based on the request, a second animation of the play, wherein the second animation of the play is configured to be displayed on the third user device; and
send, by the server to the third user device, the second animation of the play.

9. The system of claim 8, wherein the flat file further comprises an indication of a second player, one or more third datapoints, of the plurality of datapoints, associated with a starting position of the second player, and one or more fourth datapoints, of the plurality of datapoints, associated with a finishing position of the second player.

10. The system of claim 9, wherein the first animation of the play illustrates the first player moving from the starting position to the finishing position and the second player moving from a second starting position to a second finishing position.

11. The system of claim 8, wherein the server is configured to generate the plurality of animations of the play by:
scaling, based on a display size associated with a device, the plurality of datapoints.

12. The system of claim 8, wherein the flat file comprises at least one of:
a comma-separated values (CSV) file; or
a JavaScript Object Notation (JSON) file.

13. The system of claim 8, wherein the playing field comprises at least one of:
a football field;
a baseball field;
a softball field;
a soccer field;
a lacrosse field;
a basketball court;
a volleyball court;
a tennis court;
an ice hockey rink;
a field hockey pitch;
a cricket field; or
a rugby field.

14. A server comprising:
one or more processors; and
memory storing instructions that, when executed by the one or more processors, configure the server to:
receive, from an application executing on a first device and via a first application programming interface, a flat file, wherein the flat file comprises an indication of a playing field, an indication of a first player, one or more first datapoints, of a plurality of datapoints, associated with a starting position of the first player, and one or more second datapoints, of the plurality of datapoints, associated with a finishing position of the first player;
generate, using the flat file, a first animation of a play;
generate a second animation of the play, wherein the second animation of the play is configured to be displayed on a second device that is different than the first device;
receive, via a social networking portal, one or more comments regarding the play;
receive, from an application executing on a third device, a request for the play;
query a database to determine a type of device for the third device;
select, and based on a determination of the type of device for the third device, the second animation; and
send, to the application executing on the third device and via a second application programming interface, the second animation and the one or more comments, wherein the third device is configured to share the second animation and the one or more comments via a short-range wireless communication protocol while in an offline mode.

15. The server of claim 14, wherein the flat file further comprises an indication of a second player, one or more third datapoints, of the plurality of datapoints, associated with a starting position of the second player, and one or more fourth datapoints, of the plurality of datapoints, associated with a finishing position of the second player.

16. The server of claim 15, wherein the first animation of the play illustrates the first player moving from the starting position to the finishing position and the second player moving from a second starting position to a second finishing position.

17. The server of claim 14, wherein the instructions, when executed by the one or more processors, configure the server to generate the second animation of the play by:
   scaling, based on a display size associated with the second device, the plurality of datapoints.

18. The server of claim 14, wherein the instructions, when executed by the one or more processors, configure the server to:
   generate a plurality of animations of the play, wherein each of the plurality of animations of the play is associated with a different display size.

19. The server of claim 14, wherein the instructions, when executed by the one or more processors, configure the server to:
   generate a plurality of animations of the play, wherein each of the plurality of animations of the play is associated with a different display resolution.

20. The server of claim 14, wherein the plurality of datapoints comprise one or more coordinates on a cartesian plane.

\* \* \* \* \*